T. H. DODGE.
Mower.

No. 26,095.

3 Sheets—Sheet 1.

Patented Nov. 15, 1859.

Witnesses:

Inventor:
Thos. H. Dodge

T. H. DODGE.

Mower.

No. 26,095.

3 Sheets—Sheet 2.

Patented Nov. 15, 1859.

T. H. DODGE.
Mower.
No. 26,095.
3 Sheets—Sheet 3.
Patented Nov. 15, 1859.
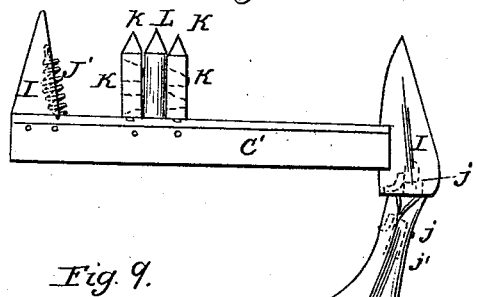
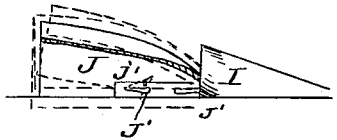
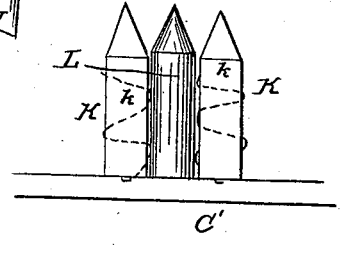
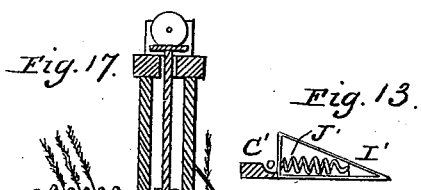
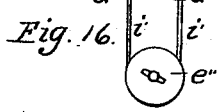
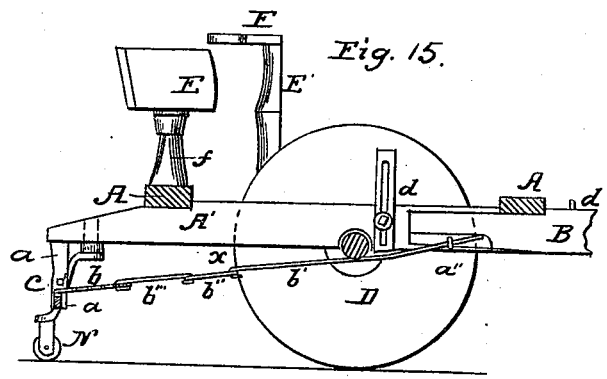
Witnesses.
Inventor.

UNITED STATES PATENT OFFICE.

THOMAS H. DODGE, OF WASHINGTON, DISTRICT OF COLUMBIA.

IMPROVEMENT IN MOWING-MACHINES.

Specification forming part of Letters Patent No. 26,095, dated November 15, 1859.

*To all whom it may concern:*

Be it known that I, T. H. DODGE, of the city and county of Washington, in the District of Columbia, have invented certain new and useful Improvements in Mowing-Machines; and I do hereby declare that the following is a sufficiently full and exact description thereof to enable those skilled in the art to which my invention belongs to make and use the same, reference being had to the accompanying drawings, and to the letters of reference marked thereon, forming a part of this specification.

Figure 1:
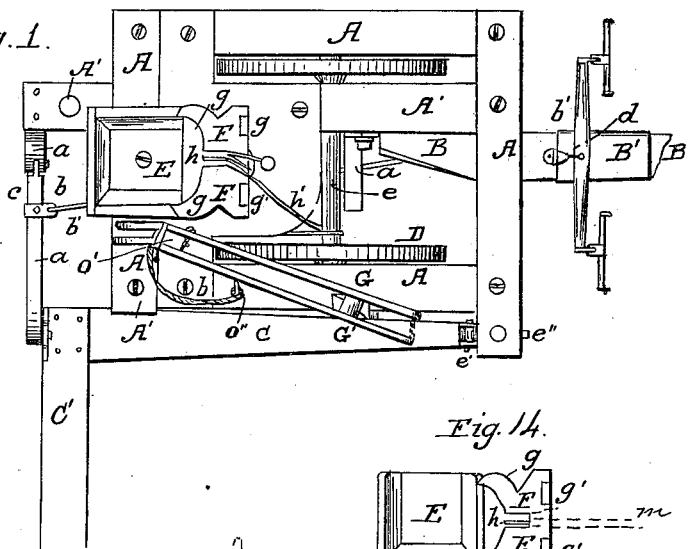
Figure 14:
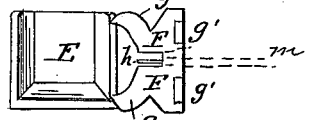
Figure 2:
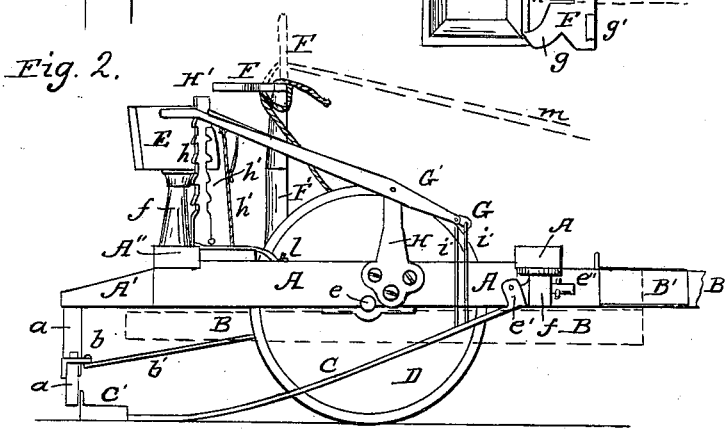
Figure 3:
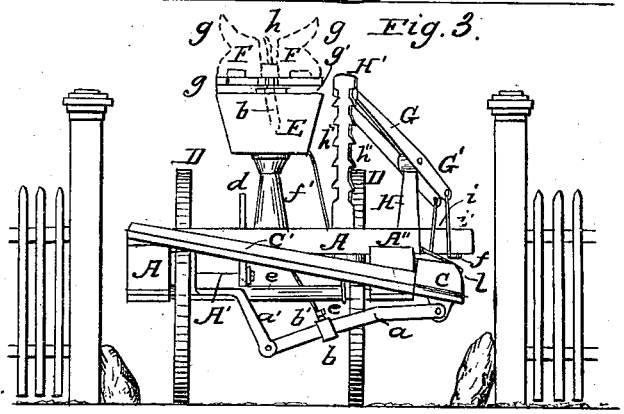
Figure 4:
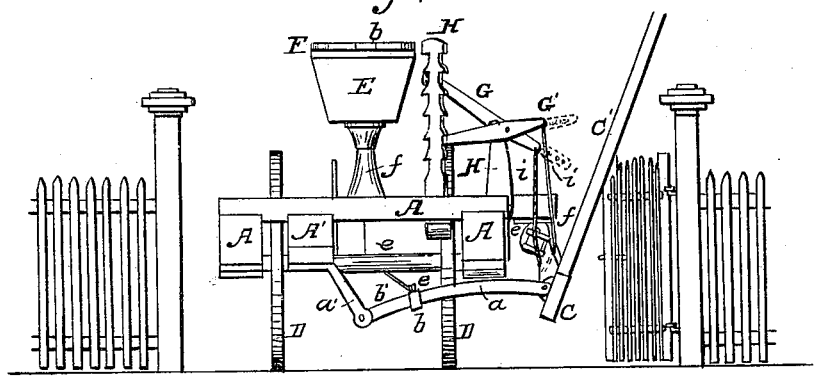
Figure 5:
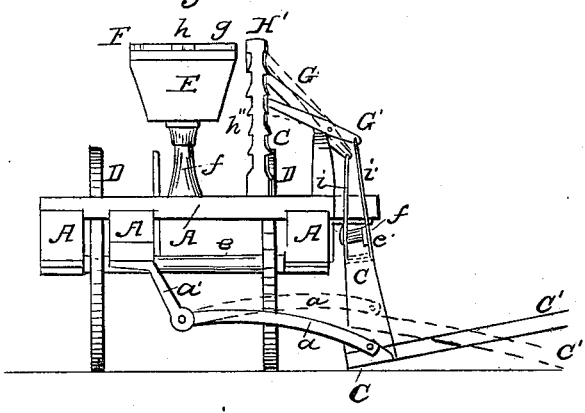
Figure 7:
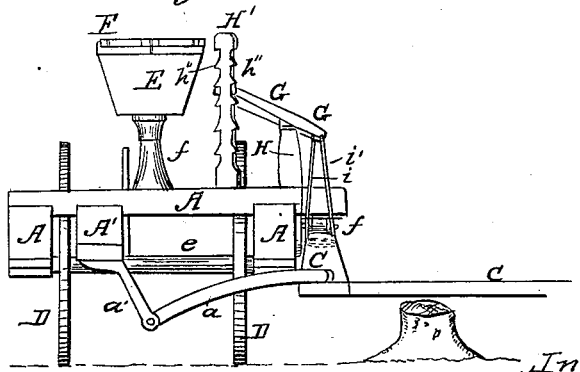

Figure 1 is a plan view; Fig. 2, a side view; Fig. 3, a rear view, with finger-beam and cutting apparatus folded over in rear of the main frame to avoid obstructions in passing through gates or from field to field; Fig. 4, a rear view of the machine with finger-bar and cutting apparatus elevated to pass through gates; Figs. 5 and 7, rear views, showing the finger-bar and cutting apparatus raised in different positions to avoid obstructions in the path of the cutter; Figs. 8, 9, 10, 11, 12, and 13, detached sections, showing the cutting apparatus, dividers, and track-clearer; and Fig. 14 represents a detached view of the driver's revolving seat, folding guard, and rein-holder. Fig. 15 is a sectional view, showing the application of the caster-wheel N and the flexible and adjustable spring draft-connection X, and Figs. 16 and 17 views of different modes in which some parts of the devices may be used.

A represents a rectangular frame supported on two wheels, D D. These wheels are represented as having one common shaft, $e$; but they may have independent shafts, together with any of the well-known forms and arrangements of gearing, although I prefer that shown in the patent of E. Ball and John Buttle, assignees of E. Ball, dated December 1, 1857. The mode of gearing, however, forms no part of my present invention, and therefore is not shown, and will not be further described. To the inside of the main frame a long shoe, C, is attached by two hinges or yielding connections—one in front of the heel of the finger-bar, the other in the rear. The front connection is shown as consisting of the parts $e'$, $e''$, and $f$, the hinge $e'$ permitting of the rear end of shoe C rising and falling in a vertical plane, while the swivel $e''$, being free to turn in the piece $f$, (which is attached to the front of the main frame,) allows it to turn laterally, or in a line at right angles to the line of motion of the machine. Any other form of yielding connection, however, may be used which will produce the same general result. The rear connection consists of a coupling-arm, $a$, hinged to the lower end of the hanger $a'$, and to a pin or bolt projecting from the rear end of the shoe C.

The machine is provided with two standards, H H, arranged in relation to each other, the driver's seat, and main frame as fully shown in Figs. 1 and 2. The rear standard, H', is provided with two sets of teeth or stops, $h''$, one set on each side, while the front standard, H, supports two levers, G G', to the front ends of which are attached chains or flexible connections $i\ i'$. The connection $i$ is attached to the front end of lever G, and passes down by the edge of the shoe C next the machine and under the lower side of the shoe, and is attached to the edge next to the standing grass or grain, while the connection $i'$ is attached to the front end of G', and passes down by and under the opposite side of the shoe, and is connected to that side of the shoe next to the main frame. By this arrangement it will be seen that when the levers are operated singly a rolling motion is communicated to the shoe, and when both are operated at the same time the shoe is raised up without turning. The levers can be made longer, as shown in dotted lines, Fig. 4, so as to give any required motion to the connections $i\ i'$, holes being made in the levers, so as to permit of the connections $i\ i'$ being attached at different distances from the fulcrum of the levers. The rear ends of the levers G G' pass one on each side of the standard H', as shown in Fig. 1, and are connected just in front of the standard H' by means of the chain or rope $h'$, (see Fig. 2,) which passes down under a pulley, then forward over and under the shaft $e$, then back and up in front of the driver's seat, where it is shown fastened to the hinged folding guard F. (See Fig. 1.) A separate chain or rope to each lever can be used.

The machine is provided with a tongue, B, so constructed that when the machine is to be packed for transportation or for storage the tongue can be folded under the frame, as shown in red lines, Fig. 2. When the machine is to be used a case, B', is slipped over the joint in the tongue, which makes it rigid.

A flexible draft-connection, $b'$, is connected to the adjusting-piece $b$ on the coupling-arm $a$, and then passed forward and up through the rear end of the tongue B, so that the draft of the cutting apparatus is through the coupling-arm $a$ and rear end of the shoe C, the team being hitched to the connection $b'$ at $d$, Fig. 1. The piece $b$ can be moved on the arm $a$ to change the draft. If preferred, the flexible draft-connection may be so constructed that only a certain amount of draft will be through the coupling-arm $a$. To effect this the flexible connection should be provided with a stop, $a''$, near its front end, (see Fig. 15,) a spring, $b''$, a hook, $b'''$, while the piece $b$ should be provided with a series of holes, $b''''$, and constituting what I call the "flexible draft-adjusting spring-connection" X, and by the use of which, when the draft exceeds a certain amount, the spring will yield and allow the stop to strike against the front of the machine. In this way the draft on the coupling-arm can be varied at pleasure by simply moving or adjusting the hook $b'''$ into a different hole in the piece $b$. The guide-piece $d$ can be adjusted up or down, as may be desired.

Upon the rear cross-timber of the main frame is a standard, $f'$, which supports a revolving seat, E, to be used by the driver.

In mowing and reaping machines there is great danger of the driver being thrown from his seat onto the cutters, and more especially when a revolving seat is used. To guard against this I erect in front of the seat a standard, F', to the top of which is hinged a guard, F, as seen at $g'$ $g'$, the center of which is rounded out, so that when turned down, as seen in Fig. 1, the driver will be well supported both in front and at his sides, the curved portions $g'$ $g'$ affording lateral support. The center of the folding guard F is slotted out and provided with a spring, $h$, (see Figs. 1 and 14,) the object of which is to provide a rein-hitch for the driver. To use this device the driver pushes the spring to one side and then puts the reins in, when the spring, retracting, holds them, and thus all danger of the reins getting under the horses' feet or entangling in the gearing when the driver has occasion to get off the machine is obviated. It also sometimes happens that the driver has occasion to use both hands in raising up the cutting apparatus in heavy grass and grain, and in such cases the reins are always kept in a secure position and within his reach by means of a rein-hitch, as above described. The driver can turn his body, in consequence of the seat E being pivoted, so as to face in any direction to adjust the levers, the finger-bar in rear of the seat, or for any other purpose. He can also get out of his seat by turning it half-way round, as seen at Fig. 14, or he can turn up the folding guard F, as seen in Figs. 2 and 3. It will be observed that the folding guard answers the purpose of a rein-hitch when turned up as well as down.

So much of the cutting apparatus as is necessary to illustrate the features claimed therein as new is shown in Figs. 8 and 11. A series of spiral cutters are arranged on the finger-bar C'. Two of them, K K', are represented in the drawings. These cutters work in caps $k$, open on each side, the cutters bearing against smooth rolls L, which may also have caps $k$, if preferred. The operation of the cutters is as follows: As the machine is drawn along, a rotary motion being communicated to the cutters in any desirable manner, (one way being shown in Fig. 12, where the cutters are shown provided with a bevel-gear which takes into one on a shaft running by the end of the cutter-shaft and at right angles thereto,) they cut the grass and grain as they pass between the roll L and the cutters. When only a single roll is used between the cutters, as shown in Fig. 8, one cutter must be turned in one direction and the other in a reverse direction. The spiral knife need not go more than once round, nor even that, in order to cut the grain and grass perfectly, provided the speed be sufficient. Instead of a single roll L, two small rolls might be used, and so arranged as to act independently of each other, having one common cap open at the sides. In the use of two rolls it would be best to support them in front and rear, the same as the cutters, and, if deemed necessary or desirable, they could be turned by gearing or otherwise, the same as the cutters. One cutter might also be made to cut against another, and thus dispense with the rolls.

As the machine passes along a portion of the standing grass or grain next to the stubble is liable to be trailed down, and with a view of bringing it up into an upright position before it is cut, or into such a position as to prevent its dragging over and around the heel of the finger-beam after it is cut, I make the inner divider, I', open on the side next to the cutters, and provide it with a spiral, J', which projects from its side, (see Fig. 8,) so that as the machine is drawn along (a rapid motion being communicated to the spiral J') the leaning stalks will be raised or drawn up and back by the action of the spiral thereon. It will be understood that the spiral must be turned in such a direction as that anything between its coils will be drawn back toward the finger-beam. The spiral may be operated in any desirable manner, one mode of doing which is shown in Fig. 13, where a bevel-gear on the end of the spiral shaft is represented as taking into a similar gear on a shaft running at right angles to the shaft of the spiral. A similar spiral could be used with advantage in the divider I, while for reaping a series of them could be arranged above the cutters, being sustained by downward-projecting hollow arms from a frame above, as shown in Fig. 17, and thus obviate the use of a reel. By the use of a series of these spirals in reaping-machines they would have a tendency to draw the machine forward as they worked into the standing grain.

In rear of the divider I is the track-clearer J. This track-clearer may be of any desirable form, and is hinged to parallel cranks $jj$, which receive their support from the projecting piece $j'j'$. The object of hinging the track-clearer in this manner is to enable it to rise and fall at either end, or bodily, without tipping the cutters or fingers, and also to give it a forward and back motion as it is drawn along over the ground, which is always more or less uneven. The cranks are so arranged that they cannot descend to a perpendicular position, and consequently any very great pressure against the bottom of the track-clearer will cause the cranks to rise, and also to advance forward, thus giving to the track-clearer a constant jumping forward and back motion, which helps to relieve it from any grass which may have a tendency to lodge there.

Some of the different positions which the track-clearer can assume are shown in different colors in Fig. 9. In cutting heavy grass it requires considerable weight to keep the track-clearer firm in place; and to enable the driver to adjust the weight of the track-clearer to suit the grass to be cut I provide it with a box, M, Fig. 10, so that he can adjust the weight by putting in or taking out the weights in the box M. The box M is provided with a hinged cover, o. Stones, gravel, or earth can be used as weights, or anything which happens to be convenient.

In some cases it may be found both convenient and desirable to use the machine without the case B', and in which case I provide the projecting piece A' with a caster-wheel, N. (See Fig. 15.) When the machine is used in this condition the front of the tongue can fall or turn down without affecting the position of the main frame, and as the weight of the frame is allowed to preponderate a little in rear of the axes of the supporting-wheels the caster-wheel N supports the rear end of the machine when the machine is not in operation, while the draft on the front of the frame, when the machine is in operation, tends to balance the machine.

When the driver desires to raise the heel of the finger-bar, as shown in red lines, Fig. 5, he depresses the rear end of lever G and the rear end of lever G' to raise the outer end of the finger-bar, as shown in black lines, same figure. When the entire bar is to be raised in a horizontal position, to avoid obstructions in the path of the cutters, as shown in Fig. 7, both levers are to be depressed alike. (See Fig. 7.

When the finger-bar and cutting apparatus are to be raised to pass through gates or by high stumps the heel of the finger-bar is first raised by depressing lever G slightly, and then the outer end of the finger-bar raised up toward the machine by depressing lever G'. (See Fig. 4.)

When the machine is to be moved from field to field the finger-bar can be folded over in rear of the main frame and allowed to rest on the projecting piece A', as shown in Fig. 3. It may be folded over by an attendant on the ground without the use of the levers G G'.

To keep the finger-bar and shoe C steady, a chain, l, is provided, with a staple, o'', and a hook, o', the staple o'' being made fast in the top of the main frame, as shown in Fig. 1, so that after the finger-bar has been folded over, as shown in Fig. 3, the chain l is passed down between the shoe C and the main frame, and then under, up, and over the shoe, and the hook o' hooked into the staple o''. By this arrangement the side of the shoe is held up firm against the end A'' of the rear cross-timber of the main frame, which is projected over for that purpose, while the front end of the finger-bar rests firmly on the top of the piece A'. By projecting the shoe C back, so as to fold the finger-bar and cutting apparatus over in rear of the main frame, there is less liability of dropping cut stalks on the machine or into the gearing; nor is there any danger of getting the reins entangled in the cutting apparatus during the operation of folding or unfolding when the operation is performed in the field.

Another advantage resulting from my arrangement of folding the finger-bar consists in the facts that the driver can fold and unfold the same without leaving his seat. This may be done in several ways, two of which may be described thus: The driver may first, by means of the levers, elevate the finger-bar into an upright position at the side of the frame, and then take hold of it and lay or fold it down on the piece A', the seat E allowing him to turn his body around for this purpose. Another way in which he could fold it would be by the use of the levers alone, as follows: By suddenly depressing the lever G' after the finger-bar is raised into an elevated position at the side of the frame, as shown in Fig. 4, the finger-bar will be turned over toward the frame, and as soon as it passed the center of gravity it would descend by its own weight, while the driver, by the use of lever G, could control its descent until it rested on the piece A'. To unfold the bar the operation would be reversed.

It will be observed that, in whatever position the finger-bar may be held by the levers G G' when the machine is in motion, the entire bar, or either end, can rise above the position in which it is held, to conform to any elevation of ground which may be higher than that portion of the finger-bar which passes over it.

The stops h'' on the standard H' are inclined downward, so as to permit the levers G G' to slip down when passed; but no amount of pressure can cause the levers to rise until they are first sprung out laterally from under the stops. The spring of the levers is sufficient to keep them in either stop, whether any strain is on the flexible connections or not. The levers are so arranged that the driver can operate either or both with one, or he can use both hands, as occasion may require, while by means of the cord or chain h' he can, by pressing it with his foot or pulling it with his hand, so as to cause friction on the shaft e or its equivalent, combine the power of the team, together with the strength of his hands and feet, to raise the finger-bar and cutting apparatus.

The part of the shoe C where the chain or cords $i\ i'$ are attached can be made cylindrical, if preferred. The shoe C could also be turned by means of a tight pulley on the end of $e''$. (See Fig. 10.)

Having thus described my improvements in mowing-machines, what I claim therein as new, and desire to secure by Letters Patent, is—

1. The arrangement and combination of the levers, standards, and cords $i\ i'$, or their equivalents, with shoe C, whereby the driver, from his seat on the machine, can elevate either end of the finger-bar independently of the other, or the entire bar, substantially as described, for the purposes specified.

2. The combination of the cutting apparatus with the main frame and mechanism represented in Figs. 2 and 16, or its equivalent, so constructed and arranged that the driver can, without leaving his seat on the machine, fold up and unfold the finger-bar without taking hold of it with his hand, substantially as and for the purposes stated.

3. The combination and arrangement of the levers G G′ with the driver's seat E and cord or chain $h'$, whereby the driver may, when necessary, employ both his hands and his feet, together with the power of the team, to raise the finger-bar and cutting apparatus, substantially as set forth.

4. So combining mechanism with the machine as that the driver can employ the power of the team to assist to elevate the finger-bar and cutting apparatus at pleasure without changing the horizontal position of the main frame, substantially as described.

5. In a reaping and mowing machine, the folding guard F and rein-hitch $h$, in combination with the driver's seat, substantially as and for the purposes set forth.

6. The flexible or adjustable draft-connection $b'$ or X, to which the team is attached, in combination with the coupling-arm $a$ and shoe C, substantially as and for the purposes set forth.

7. The spiral cutters K, when constructed and arranged as shown in Fig. 11, and operating substantially as and for the purposes set forth.

8. Hinging the track-clearer to the extension-piece $j'$, or its equivalent, by means of the cranks $j\ j$, for the purposes described.

9. So constructing the track-clearer that its weight may be adjusted in the manner and for the purposes substantially as set forth.

THOS. H. DODGE.

Witnesses:
   JOHN Q. ADAMS,
   A. C. WIDDICOMBE.